(12) United States Patent
Deseure

(10) Patent No.: US 11,717,789 B2
(45) Date of Patent: Aug. 8, 2023

(54) METHOD FOR PURIFYING A CARRIER GAS

(71) Applicant: UNIVERSITE GRENOBLE ALPES, Saint Martin d'Heres (FR)

(72) Inventor: Jonathan Deseure, Challes les Eaux (FR)

(73) Assignee: UNIVERSITE GRENOBLE ALPES, Saint Martin d'Heres (FR)

( * ) Notice: Subject to any disclaimer, the term of this patent is extended or adjusted under 35 U.S.C. 154(b) by 574 days.

(21) Appl. No.: 16/766,468

(22) PCT Filed: Nov. 22, 2018

(86) PCT No.: PCT/EP2018/082150
§ 371 (c)(1),
(2) Date: Jul. 7, 2020

(87) PCT Pub. No.: WO2019/101828
PCT Pub. Date: May 31, 2019

(65) Prior Publication Data
US 2020/0376429 A1 Dec. 3, 2020

(30) Foreign Application Priority Data
Nov. 24, 2017 (FR) ...................................... 1761173

(51) Int. Cl.
*B01D 53/32* (2006.01)
*B01D 53/96* (2006.01)

(52) U.S. Cl.
CPC ......... *B01D 53/326* (2013.01); *B01D 53/965* (2013.01); *B01D 2256/16* (2013.01);
(Continued)

(58) Field of Classification Search
CPC ............ B01D 53/326; B01D 2257/104; B01D 2257/404; B01D 2257/502;
(Continued)

(56) References Cited

U.S. PATENT DOCUMENTS 3,963,597 A 6/1976 Kleitz et al.
6,641,789 B1 * 11/2003 Thomson ............... B01D 53/56
422/607

(Continued)

FOREIGN PATENT DOCUMENTS

EP 3037151 A1 6/2016
FR 2695570 A1 3/1994
WO 2007110657 A1 10/2007

OTHER PUBLICATIONS

Fouletier et al., J., "Electrically renewable and controllable oxyen getter," Associated Mineral Electrochemical Kinetics Laboratory at CNRS, ENS in Electrochemistry and Electrometallurgy of Grenoble, Domaine Universitaire, vol. 25, No. 7, pp. 307-314, Mar. 20, 2975, Pergamon Press, Great Britain.

(Continued)

*Primary Examiner* — Nicholas A Smith
(74) *Attorney, Agent, or Firm* — Hauptman Ham, LLP

(57) ABSTRACT

The invention relates to a method for purifying a carrier gas which comprises oxygenated impurities in a first oxidation degree, the purification method comprising the circulation, advantageously uninterrupted, of the carrier gas through and along a direction XX' of a filter, the filter being made of an oxygen scavenger material which has a redox potential $E°$, and of which a first portion is in a reduced redox state and within which the oxygenated impurities are scavenged and/or pass from the first oxidation degree to a second oxidation degree, the method further comprising the application to the filter of a greater electric potential $\Delta V$, as an absolute value, than the redox potential $E°$ during a main purification cycle CP.

13 Claims, 3 Drawing Sheets

(52) U.S. Cl.
CPC .... *B01D 2256/18* (2013.01); *B01D 2257/302* (2013.01); *B01D 2257/502* (2013.01); *B01D 2257/80* (2013.01)

(58) Field of Classification Search
CPC .......... B01D 2257/302; B01D 2257/80; B01D 53/965; B01D 53/96
See application file for complete search history.

(56) References Cited

U.S. PATENT DOCUMENTS

| | | |
|---|---|---|
| 2009/0004072 A1 | 1/2009 | Hamamoto et al. |
| 2016/0177458 A1* | 6/2016 | Deseure ............... B01J 20/3441 205/337 |

OTHER PUBLICATIONS

International Search Report and Written Opinion issued in corresponding International Application No. PCT/EP2018/082150, dated Jan. 25, 2019, pp. 1-8, European Patent Office, Rijswijk, Netherlands.

* cited by examiner

METHOD FOR PURIFYING A CARRIER GAS

RELATED APPLICATIONS

The present application is a U.S. National Phase of International Application Number PCT/EP2018/082150, filed Nov. 22, 2018, and claims the priority of French Application No. 1761173, filed Nov. 24, 2017.

TECHNICAL FIELD

The present invention relates to a method for purifying a carrier gas loaded with oxygenated impurities. In particular, the invention relates to a method for purifying a carrier gas loaded with oxygenated impurities implementing an electro conversion of said oxygenated impurities.

The invention is in particular implemented for the purification of hydrogen loaded with carbon monoxide.

PRIOR ART

Oxygen scavenger materials are known to a person skilled in the art to make it possible for an oxidation degree change reaction (called "electro conversion") of chemical species, in particular oxygenated chemical species (also called "oxygenated impurities").

In this regard, such as described in documents [1] and [2] cited at the end of the description, the oxygen scavenger materials can comprise a metal oxide solid solution, in particular zirconia (zirconium dioxide), and even more particularly, stabilised zirconia.

The electro conversion of chemical species thus rests on a difference in thermodynamic potential between the oxygen scavenger material at least partially and the chemical species considered.

This ability for the oxygen scavenger materials to make it possible for the electro conversion of oxygenated impurities is particularly useful for the purification of a carrier gas, in particular, hydrogen, comprising oxygenated impurities.

Such a method for purifying the carrier gas can thus comprise the passage of said gas through a filter comprising the oxygen scavenger material, the filter taking the form of a ceramic with an open porosity, said oxygen scavenger material being in an at least partially reduced state.

The passage of the carrier gas through the filter makes it possible for a close putting into contact of oxygenated impurities with the ceramic such that the scavenging and/or the electro conversion of said impurities can occur.

However, this method is not satisfactory.

Indeed, the inventors have noted a loss of effectiveness over time of the method of purifying the carrier gas. This loss of effectiveness can be particularly damaging since it prevents any continuous use of the method for purifying the carrier gas, which could in particular be required for the purification of hydrogen in the field of fuel cells.

The loss of effectiveness of the purification method is due, on the one hand, to a saturation through products of the electro conversion of the surface of the grains of the ceramic, and on the other hand, to an inhomogeneity of the oxidation degree within each grain of said ceramic.

These two effects are distinct and do not contribute, according to the same methods, to the loss of effectiveness of the purification method.

Indeed, the saturation of the surface of the grains prevents any close contact between said grains and the oxygenated impurities, limiting, even preventing, in fact, the electro conversion of the oxygenated impurities.

The inhomogeneity of the oxidation degree within the grains itself limits the scavenging ability of said impurities.

An aim of the present invention is to propose a method for purifying a carrier gas loaded with oxygenated impurities able to continuously operate.

Another aim of the present invention is to propose a method for purifying a carrier gas loaded with oxygenated impurities, wherein the saturation of the surface of the grains of the ceramic is, at least, limited.

SUMMARY OF THE INVENTION

The aims of the present invention are, at least partially, achieved, by a method for purifying a carrier gas which comprises oxygenated impurities in a first oxidation degree, the purification method comprising the circulation, advantageously uninterrupted, of the carrier gas through and along a direction XX' of a filter, the filter being made of an oxygen scavenger material which has a redox potential F, and of which a first portion is in a reduced redox state and within which the oxygenated impurities are scavenged and/or pass from the first oxidation degree to a second oxidation degree, wherein the oxygen scavenger material is a ceramic which has an open porosity, the method further comprising the application to the filter of a greater electric potential $\Delta V$, as an absolute value, to the redox potential $E°$ during a main purification cycle CP.

According to an implementation embodiment, the oxygen scavenger material further comprises, along the direction XX', a second non-reduced portion contiguous to the first portion along a front, called reduction front F, able to be moved at the expense of the first portion once the filter is passed through by a current, called polarisation current, during the main purification cycle CP.

According to an implementation embodiment, during the main purification cycle CP, the electric potential $\Delta V$ is also less than a predetermined electric potential $\Delta V_p$, the predetermined electric potential $\Delta V_p$ being adjusted such that the positive portion of the time variation and by a surface unit of the polarisation current is less than 20 mA/cm$^2$/h.

According to an implementation embodiment, once the extension of the first portion along the axis XX' exceed a predetermined length during the main purification cycle CP, the purification method implements a regeneration cycle CR of the filter intended to reposition the reduction front F to a value of choice, the regeneration cycle CR comprising the application of an electric potential $\Delta V$ greater than the predetermined electric potential $\Delta V_p$.

According to an implementation embodiment, the purification method also comprises a rebalancing cycle CRI intended to electro-chemically rebalance the grains of the ceramic, the rebalancing cycle CRI comprising the short-circuiting of the filter, advantageously the rebalancing cycle CRI is implemented once the scavenging rate of the oxygenated impurities at the level of the first portion is less than a threshold.

According to an implementation embodiment, the ceramic is maintained at a temperature comprised between 600° C. and 1100° C.

According to an implementation embodiment, the electric potential $\Delta V$ is applied by a voltage generator to the two ends of the filter.

According to an implementation embodiment, during the execution of the purification method, the polarisation current is measured continuously.

According to an implementation embodiment, the scavenger material comprises a metal oxide solid solution, the metal oxide solid solution comprises, in particular, a ZrYO or ZrScO solid solution, or a $ThO_2$ and $LaGaO_3^-$ based structure, with or without double substitutions of $Y_2O_3$ or $Sc_2O_3$ by $CeO_2$ or $AlO_3$, or a mixture $8(Y_2O_3)10(Al_2O_3)$.

According to an implementation embodiment, the carrier gas comprises a neutral gas, advantageously the neutral gas comprises argon and/or nitrogen.

According to an implementation embodiment, the gas comprises hydrogen or helium.

According to an implementation embodiment, the oxygenated impurities comprise carbon monoxide or nitrogen monoxide.

According to an implementation embodiment, the oxygenated impurities comprise $H_2O$, $SO_2$.

BRIEF DESCRIPTION OF THE DRAWINGS

Other features and advantages will appear in the following description of the method for purifying a carrier gas according to the invention, given as non-limiting examples, in reference to the appended drawings, wherein.

DETAILED DESCRIPTION OF PARTICULAR EMBODIMENTS

The present invention relates to a method for purifying a carrier gas loaded with oxygenated impurities. The purification method implements the circulation of the carrier gas through a filter made of an at least partially reduced oxygen scavenger material.

The maintenance of the filter in a state, at least partially reduced by application of an electric potential makes it possible to ensure the scavenging and/or the electro conversion of the oxygenated impurities.

Figure 1:
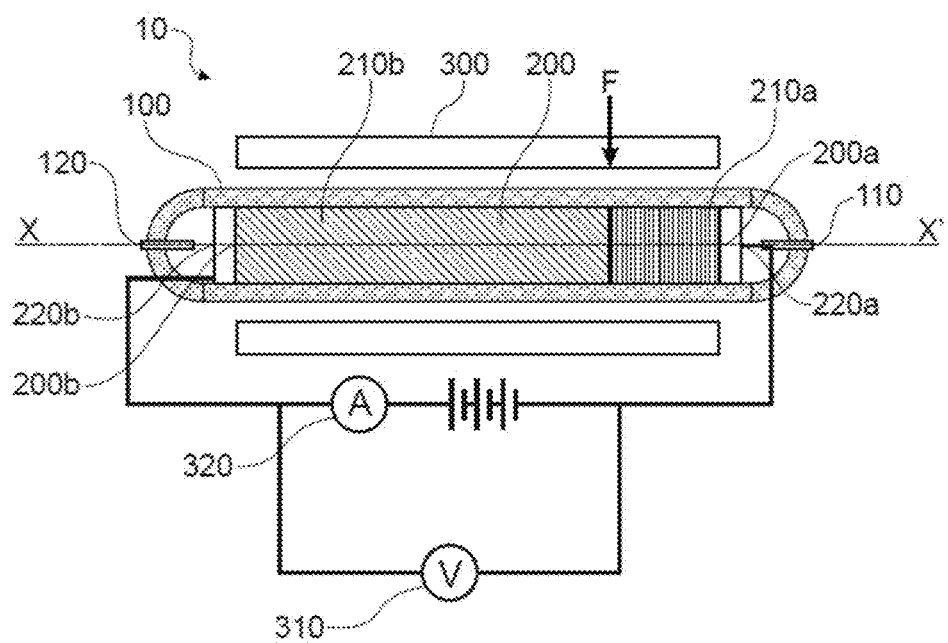
FIG. 1 is a schematic representation of a gas purification device along a longitudinal cross-sectional plane (comprising the axis XX') likely to be implemented in the scope of the present invention.

FIG. 1 is a schematic representation of a device for purifying 10 carrier gas which could be implemented in the scope of the present invention.

In particular, the purification device 10 can comprise a sealed conduit 100 (for example, a bulb) provided with an inlet 110 and an outlet 120 of carrier gas.

The conduit 100 is made of a material which is resistant to high temperatures, for example to temperatures which could reach 1000° C., even 1200° C.

A filter 200 which extends along a direction XX' is positioned in adjustment in the conduit 100. The filter 200 is made of an oxygen scavenger material which has a redox potential F. In other words, the oxygen scavenger material can be in different oxidation degrees, in particular in a reduced state and a non-reduced state, the two states forming a redox pair of redox potentials E.

By "reduced state", this means a reduced redox state.

By "non-reduced state", this means a non-reduced redox state, of which the redox degree is greater than that of the reduced state.

By "oxygen scavenger material", this means a material able to adsorb on the surface thereof of the oxygenated elements and to insert oxygen into the crystalline network thereof, for example carbon monoxide (CO) or also nitrogen monoxide (NO), or also water or sulphur dioxide.

It is understood that once the filter 200 extends along a direction XX', said filter 200 comprises two ends aligned with the direction XX', in particular, the filter 200 comprises an upstream end 200a and a downstream end 200b. Thus, any carrier gas entering into the conduit 100 through the inlet 110 will pass through the filter 200 from the upstream end 200a thereof to the downstream end 200b thereof.

By "positioned in adjustment", this means a filter 200 which has a form according to an inner wall of the conduit between which said filter 200 supports it. In other words, the positioning in adjustment of the filter 200 in the conduit 100 imposes on any gas entering into said bulb 100 to pass through said filter 200.

Advantageously, the filter 200 can be a ceramic, in particular a ceramic with open porosity. It is understood that the open porosity makes it possible for the passage of a gaseous flow through the filter 200.

A ceramic comprises a set of grains, made of oxygen scavenger material, welded together at the level of grain boundaries. The surface of the grains accessible to the gas corresponds to the surface, called active surface, of the filter 200.

Such a filter 200, in the form of a ceramic with open porosity, can for example be obtained by sintering a metal oxide solid solution, for example in the form of a bar of length L along the direction XX', and of cross-section S.

By "cross-section S", this means a surface defined by the intersection of the bar with a plane perpendicular to the direction XX'. The length L can be comprised between 20 mm and 40 mm. The cross-section S can be a disk of diameter D comprised between 6 mm and 10 mm, for example 8 mm.

Advantageously, the cross-section S of the bar is sized such that the ratio of the carrier gas flow over said cross-section S is less than 250[m/h].

The metal oxide solid solution can comprise any ZrYO-type solid solutions (for example, zirconia stabilised with 8% molar of yttrium) or ZrScO, with or without double substitutions (of $Y_2O_3$ or $Sc_2O_3$, either by $CeO_2$ or by $AlO_3$), but also any structures like $ThO_2^-$ and $LaGaO_3^-$ similar to the $ZrO_2^-$ bases, with or without double substitutions (of $Y_2O_3$ or $Sc_2O_3$, either by $CeO_2$ or by $AlO_3$). The mixtures $8(Y_2O_3)10\ (Al_2O_3)$ can also be cited.

As an example, a Zirconium-based solution can be used, such as $Zr_{1-x}Y_xO_{2-x/2}$ or $Zr_{1-x}Sc_xO_{2-x/2}$ for x comprised between 0.03 and 0.11. Also, a double substitution solid solution can be used, like $ZrO_2(0.86)Y_2O_3(0.1)CeO_2(0.04)$ or $ZrO_2(0.9)Y_2O_3(0.09)CeO_2(0.01)$.

Moreover, the purification device can advantageously comprise heating means 300 intended to heat the filter 200 once the purification method is implemented.

In particular, the heating means 300 can comprise a tubular furnace inside which the conduit 100 is inserted.

Advantageously, the heating means 300 are adapted to make it possible for a temperature increase, advantageously comprised between 600° C. and 1100° C., for example 850° C., of the filter 200.

The filter 200 also comprises a first portion 210a in a reduced redox state.

From the sintering, the filter 200 can be in a non-reduced state.

The formation of the first portion 210a can thus be achieved by reduction, at least partial, of the filter 200.

The at least partial reduction of the filter 200 can thus be executed by application of an electric potential to said filter 200.

In this regard, the filter 200 can comprise an upstream electrode 220a and a downstream electrode 220b, positioned, respectively, at the level of the upstream 200a and downstream 200b ends.

The upstream 220a and downstream 220b electrodes are advantageously porous and can be formed by application to the brush or a conductive ink, in particular a conductive ink comprising at least one of the materials selected from among: $La_{(1-x)}Sr_xMnO_3$, $La_{(1-x)}Sr_xCoO_3$, $La_{(1-x)}Sr_xFeO_3$ (with, for each of these materials x comprised from 0.2 to 0.3), $Pr_{(1-y)}Sr_yFeO_3$ with Y comprised between 0.2 and 0.5, $LaNi_{0.6}Fe_{0.4}O_3$, $Ba_{0.5}Sr_{0.5}Co_{0.8}Fe_{0.2}O_3$, $Sm_{0.5}Sr_{0.5}CoO_3$, $Sr_{0.9}Ce_{0.1}Fe_{0.8}Ni_{0.2}O_3$, $La_{0.7}Sr_{0.3}Fe_{0.8}Ni_{0.2}O_3$, $La_{0.8}Sr_{0.2}Co_{0.8}Fe_{0.2}O_3$, $La_{0.5}Sr_{0.4}Co_{0.8}Mn_{0.2}O_3$, $La_{0.6}Sr_{0.4}Co_{0.9}Cu_{0.1}O_3$, $Pr_{0.8}Sr_{0.2}Co_{0.2}Fe_{0.8}O_3$, $Pr_{0.7}Sr_{0.3}Co_{0.2}Mn_{0.8}O_3$, $Pr_{0.6}Sr_{0.4}Co_{0.8}Fe_{0.2}O_3$, $Pr_{0.7}Sr_{0.3}Co_{0.9}Cu_{0.1}O_3$.

The upstream 220a and downstream 220b electrodes can also be connected to a voltage generator 310 intended to impose an electric potential ΔV to the filter 200.

The filter 200 can also comprise, along the direction XX', a second non-reduced portion 210b contiguous to the first portion along a front, called reduction front F. Below in the description, it will be seen that the reduction front F is not fixed and can therefore undergo a movement under the action of a polarisation current generated during a main purification cycle CP of the carrier gas.

The method according to the present invention thus comprises the circulation of a carrier gas loaded with oxygenated impurities through the filter 200 from the upstream end 200a to the downstream end 200b.

The oxygenated impurities have a first oxidation state.

The oxygenated impurities can comprise carbon monoxide and/or nitrogen monoxide.

The oxygenated impurities can also comprise at least one of the elements selected from among: water, sulphur dioxide.

Moreover, once the oxygenated impurities flow, with the carrier gas, in the first region they are scavenged and/or pass from the first oxidation degree to a second oxidation degree (electro conversion) different from the first oxidation degree.

In this regard, the electro conversion of carbon monoxide leads to the formation of carbon dioxide and carbon according to the following electrochemical reaction:

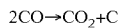

From this reaction, carbon dioxide passes through the filter 100 in its entirety, while the carbon remains scavenged at the level of the first portion 210a.

A measurement of the carbon dioxide rate at the outlet of the filter 200 (downstream end 200b) makes it possible to have access to the electro conversion rate with respect to the direct scavenging of carbon monoxide in the first region 210a.

The preponderance of either of these two effects, namely the scavenging or the oxidation degree change, depends on the nature of the carrier gas.

As an example, an electro conversion will be favoured once the carrier gas is a neutral gas, for example helium, argon, neon, xenon or nitrogen, while the scavenging of the oxygenated impurities will be predominant once the carrier gas is or comprises dihydrogen or a reductive gas (methane and alkanes type).

In any event, whatever the nature of the carrier gas, these two effects coexist, and lead to an accumulation, either of carbon (once there is electro conversion of the impurities), or CO (once there is scavenging of the impurities) at the level of the first portion 200a. In particular, the exchange surface (or active surface) of the first portion, without other precautions, is saturated such that the performance of the purification method decreases.

To overcome this drop in performance, the inventors thus propose imposing an electric potential ΔV to the filter 200.

In particular, the electric potential ΔV can be applied to the level of the upstream 220a and downstream 220b electrodes, so as to maintain the first portion 210a in a reduced state. In other words, the electric potential ΔV is greater, as an absolute value, than the redox potential F.

The phase of the purification method according to the present invention corresponding to the application of this electric potential ΔV, also called polarisation potential, is called main purification cycle CP.

The application of this polarisation potential during the main purification cycle CP makes it possible to limit, even to prevent, the saturation of the scavenging 200, in particular of the first portion 210a, and thus to consider a continuous circulation of the carrier gas loaded with oxygenated impurities.

During the main purification cycle CP, the reduction front F, once the second portion 210b is considered, is able to be moved at the expense of the first portion once the filter 200 is passed through by a current, called polarisation current, induced by the electro conversion of the oxygenated impurities during the main purification cycle CP.

The movement of the reduction front therefore corresponds to an expansion of the second portion 210b at the expense of the first portion 210a. In other words, the polarisation current generates an electrochemical oxidation of the first portion 210a.

However, the oxygen scavenger material is contracted when it passes from a reduced state to a non-reduced state, it can be preferable for reasons of mechanical strength and/or sealing of the purification device 10 to maintain a significant length of the second portion 210b.

Also, in order to limit the movement of the reduction front F (to slow down the movement speed thereof), the polarisation voltage, during the main purification cycle, can be maintained at a value, also less than a predetermined electric potential $\Delta V_p$. For example, the predetermined electric potential $\Delta V_p$ is adjusted such that the positive portion of the time variation and by surface unit of the polarisation current is less than 20 mA/cm$^2$/h.

In this regard, the purification device 10 also comprises means for measuring the intensity of the current 320 (for example, an ammeter) crossing the filter 200, so as, for example, to be able to continuously measure said current.

Furthermore, once the extension of the first portion along the axis XX' exceeds a predetermined length during the main purification cycle CP, the purification method implements a regeneration cycle CR of the filter intended to reposition the reduction front F at a value of choice.

In this regard, the regeneration cycle CR comprises the application of a greater electric potential $\Delta V$, as an absolute value, than the predetermined electric potential $\Delta V_p$.

The regeneration cycle CR is advantageously triggered once the polarisation current crosses downwards a threshold current value.

The threshold current value is, in this scenario, a current value below which the performances of the filter are no longer satisfactory. In this regard, the performances of the filter can be determined by the quantitative analysis of the outlet gases of the filter 200, and/or the measuring of the polarisation current passing through the filter 200 during the execution of the purification method.

In particular, the threshold current value, which is dependent on the morphological and geometric features of the filter 200, can be empirically determined by a person skilled in the art.

The regeneration cycle CR can be implemented during the purification of the carrier gas. In other words, the purification of the carrier gas is not interrupted during the regeneration cycle CR.

The grains composing the ceramic, in particular in the first portion, can have an electrochemical imbalance, in particular from the reduction intended to form said first portion.

By "electrochemical imbalance", this means a non-uniform oxidation degree of the surface to the volume of the grains.

This electrochemical imbalance reduces the scavenging ability of the grains.

In order to overcome this problem, the purification method according to the present invention can also comprise a rebalancing cycle CRI intended to electro-chemically rebalance the grains of the ceramic. Indeed, as observed on the curve 3 of FIG. 2, if the ceramic is not rebalanced, it has a rapid drop of the current during the application of the polarisation $\Delta V_p$ A current drop having a gradient greater than 100 mA/h, can reveal an imbalance of the grains of the ceramic.

Figure 3:
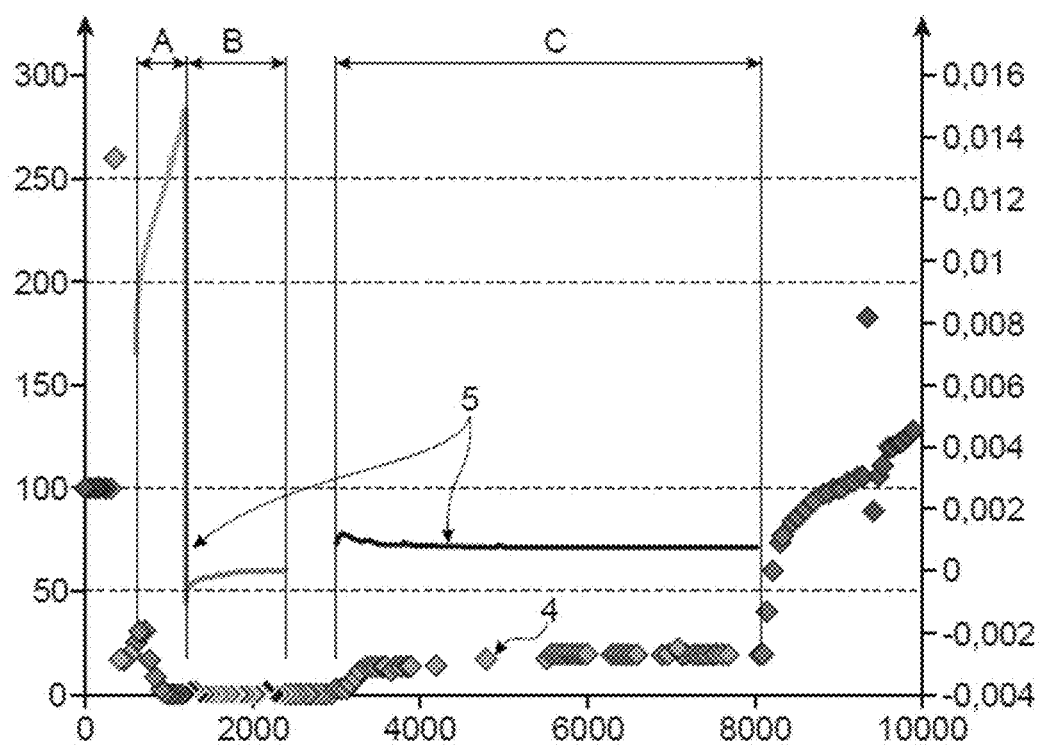
FIG. 3 is a graphic representation, over time (horizontal axis, in seconds), of the evolution of the performances of the method according to the present invention implemented for the purification of a mixture of helium and 5% dihydrogen loaded with 35 ppm of carbon monoxide, the flow of the carrier gas being 4 litres per hour, the curve 4 represents the CO rate at filter outlet (left-hand vertical axis in "%"), the curve 5 represents the polarisation current crossing the filter (right-hand vertical axis, in Amps), in particular, the zones A, B and C represent, respectively, a regeneration cycle (electric potential $\Delta V$ of $-6V$), a rebalancing cycle (short-circuiting filter), and a main purification cycle (electric potential $\Delta V$ of $-1.5V$)
Figure 4:
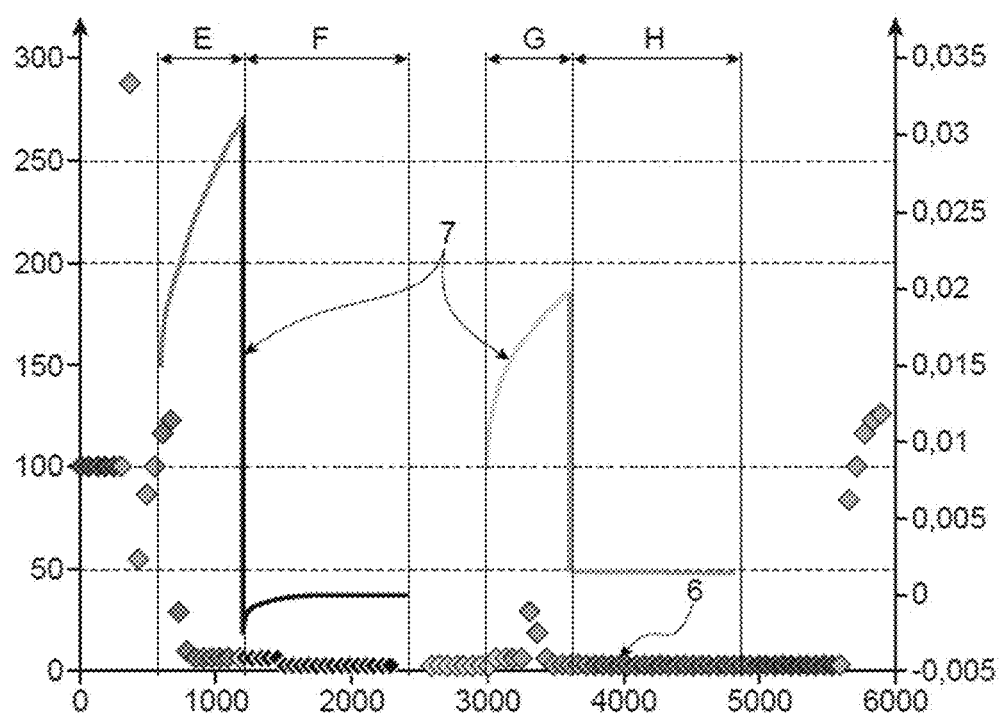
FIG. 4 is a graphic representation, over time (horizontal axis, in seconds), of the evolution of the performances of the method according to the present invention implemented for the purification of a mixture of helium and 5% of dihydrogen loaded with 31 ppm of carbon monoxide, the flow of the carrier gas being 4 litres per hour, the curve 6 represents the CO rate at the filter outlet (left-hand vertical axis in "%"), the curve 7 represents the polarisation current crossing the filter (right-hand vertical axis, in Amps), in particular, the zones E, F, G and H represent, respectively, a regeneration cycle (electric potential $\Delta V$ of $-6V$), a rebalancing cycle (short-circuiting filter), a regeneration cycle (electric potential $\Delta V$ of $-6V$) and a main purification cycle (electric potential $\Delta V$ of $-1.5V$).

The rebalancing cycle thus comprises the short-circuiting of the filter 200, thus generating the circulation of a rebalancing current through the filter 200. Such a current, observed at the level of the zones B and F, respectively, of FIGS. 3 and 4, is negative and asymptomatically extends to a zero value. The inventors consider that the rebalancing is satisfactory once the rebalancing current is less than 0.1 mA.

Figure 2:
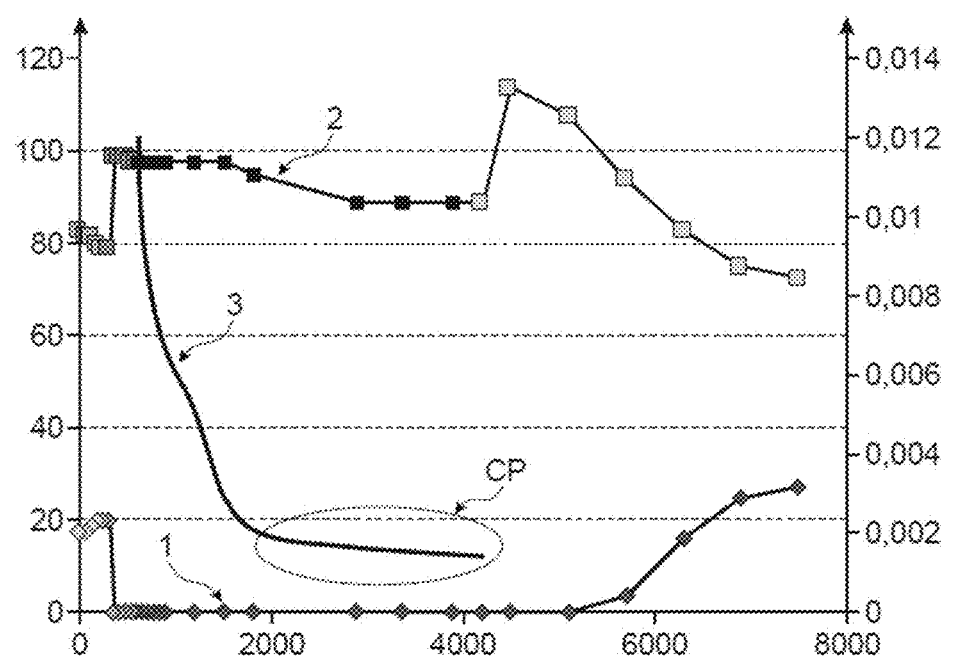
FIG. 2 is a graphic representation, over time (horizontal axis, in seconds), of the evolution of performances of the method according to the present invention implemented for the purification of helium loaded with 80 ppm of carbon monoxide, the flow of the carrier gas being 3 litres per hour, in particular the curves 1 and 2 represent respectively the CO and $CO_2$ rates at the filter outlet (left-hand vertical in "%"), the continuous line 3 represents the polarisation current crossing the filter (right-hand vertical axis, in Amps)

FIG. 2 shows that, from the application of a polarisation potential $\Delta V$ of −1.5V, a polarisation current appears (curve 3). This polarisation current, such as specified above, results from the electro conversion of the carbon monoxide into carbon dioxide (detected at the filter outlet) and into carbon. It is also observed, that in a permanent system (zone CP of FIG. 2), in other words when the variation of the polarisation current is stabilised, the electro conversion is of at least 80% of the CO contained in a neutral carrier gas, and the remainder of the carbon monoxide is captured by the filter.

FIGS. 3 and 4 show that once the carrier gas comprises dihydrogen, the scavenging is dominant regarding the electro conversion.

The purification method according to the present invention makes it possible for the purification of a carried gas continuously. In particular, whatever the cycle considered, the purification method conserves the desired performances.

REFERENCES

[1] U.S. Pat. No. 3,963,597;
[2] J. Foultier et al., Vacuum, 25, 1975, 307.

The invention claimed is:

1. A purification method of a carrier gas which comprises oxygenated impurities in a first oxidation degree, the purification method comprising a circulation, optionally uninterrupted, of the carrier gas through and along a direction XX' of a filter, the filter being made of an oxygen scavenger material which has a redox potential E°, and of which a first portion is in a reduced redox state and within which the oxygenated impurities are scavenged and/or pass from the first oxidation degree to a second oxidation degree, wherein the oxygen scavenger material is a ceramic which has an open porosity,
wherein the method further comprises an application to the filter of a greater electric potential $\Delta V$, as an absolute value, than the redox potential E° during a main purification cycle CP.

2. The method according to claim 1, wherein the oxygen scavenger material further comprises, along the direction XX', a second non-reduced portion contiguous to the first portion along a front, called reduction front F, able to be moved at the expense of the first portion once the filter is passed through by a current, called polarisation current, during the main purification cycle CP.

3. The method according to claim 2, wherein, during the main purification cycle CP, the electric potential $\Delta V$ is less than a predetermined electric potential $\Delta V_p$, the predetermined electric potential $\Delta V_p$ being adjusted such that a positive portion of a time variation and by surface unit of the polarisation current is less than 20 mA/cm$^2$/h.

4. The method according to claim 2, wherein once an extension of the first portion along the axis XX' exceeds a predetermined length during the main purification cycle CP, the purification method implements a regeneration cycle CR of the filter intended to reposition the reduction front F at a value of choice, the regeneration cycle CR comprising an application of an electric potential $\Delta V$ greater than the predetermined electric potential $\Delta V_p$.

5. The method according to claim 3, wherein the purification method also comprises a rebalancing cycle CRI intended to electro-chemically rebalance grains of the ceramic, the rebalancing cycle CRI comprising a short-circuiting of the filter, advantageously the rebalancing cycle CRI is implemented once the scavenging of the oxygenated impurities at the level of the first portion is less than a threshold scavenging rate.

6. The method according to claim 2, wherein the ceramic is maintained at a temperature comprised between 600° C. and 1100° C.

7. The method according to claim 2, wherein the electric potential $\Delta V$ is applied by a voltage generator at the two ends of the filter.

8. The method according to claim 2, wherein during an execution of the purification method, the polarisation current is measured continuously.

9. The method according to claim 1, wherein the scavenging material comprises a metal oxide solid solution, the metal oxide solid solution comprises in optionally, a ZrYO or ZrScO solid solution, or a $ThO_2^-$ and $LaGaO_3^-$-based structure, with or without double substitutions of $Y_2O_3$ or $Sc_2O_3$ by $CeO_2$ or $AlO_3$, or a $8(Y_2O_3)10(Al_2O_3)$ mixture.

10. The method according to claim 1, wherein the carrier gas comprises a neutral gas, optionally the neutral gas comprises argon and/or nitrogen.

11. The method according to claim 1, wherein the carrier gas comprises hydrogen or helium.

12. The method according to claim 1, wherein the oxygenated impurities comprise carbon monoxide or nitrogen monoxide.

13. The method according to claim 1, wherein, the oxygenated impurities comprise water or sulphur dioxide.

* * * * *